US008165062B1

(12) United States Patent  
MacDonald

(10) Patent No.: US 8,165,062 B1
(45) Date of Patent: Apr. 24, 2012

(54) WIMAX R6 CONTROL ARCHITECTURE

(75) Inventor: Daniel MacDonald, Ottawa (CA)

(73) Assignee: Nortel Networks Limited, Mississauga, Ontario (CA)

( * ) Notice: Subject to any disclaimer, the term of this patent is extended or adjusted under 35 U.S.C. 154(b) by 1433 days.

(21) Appl. No.: 11/712,030

(22) Filed: Feb. 28, 2007

Related U.S. Application Data

(60) Provisional application No. 60/777,637, filed on Feb. 28, 2006.

(51) Int. Cl.
H04W 4/00 (2009.01)
(52) U.S. Cl. ............ 370/328; 370/401; 455/422.1
(58) Field of Classification Search .......... None
See application file for complete search history.

(56) References Cited

U.S. PATENT DOCUMENTS

| | | | |
|---|---|---|---|
| 2006/0274694 A1* | 12/2006 | Rajkumar et al. | 370/331 |
| 2007/0201697 A1* | 8/2007 | Altshuller et al. | 380/247 |
| 2007/0202871 A1* | 8/2007 | Altshuller et al. | 455/428 |
| 2008/0192713 A1* | 8/2008 | Mighani et al. | 370/338 |

FOREIGN PATENT DOCUMENTS

WO WO-2006/083696 * 8/2006
* cited by examiner

Primary Examiner — Bob Phunkulh
(74) Attorney, Agent, or Firm — Robert D. McCutcheon

(57) ABSTRACT

Within an access services network (ASN) operable for providing wireless access services to an access terminal and including a base station communicatively coupled to an ASN gateway, a new functional process identified as an "R6 controller" is provided within the framework. The R6 controller includes both a controlling entity process residing and executing within the ASN gateway and an agent entity process residing and executing within the base station. The R6 controller entities monitor the R6 reference point between these two peer instances of the R6 controller, including executing a keep-alive procedure for determining the status of the R6 interface. If a problem is detected, interested client applications are notified and further actions (e.g., initiate handover process, notify ATs, etc.) may be taken. Optionally, the R6 controller entities function as gateways enabling centralized processing for message transmitted between peer instances of other client application processes spanning the base station—ASN gateway pair.

20 Claims, 4 Drawing Sheets

WIMAX R6 CONTROL ARCHITECTURE

CROSS-REFERENCE TO RELATED APPLICATION

This application claims priority under 35 USC 119(e) to U.S. provisional Application Ser. No. 60/777,637, filed on Feb. 28, 2006, and which is incorporated herein by reference.

TECHNICAL FIELD

The present invention relates generally to wireless communication systems, and more particularly to a method and system for establishing and maintaining a controller for an R6 reference point between an access point (e.g., base station) and a gateway controller within a wireless access service network.

BACKGROUND

The Worldwide Interoperability for Microwave Access Forum (WiMAX) has developed a specification that describes a radio interface for wireless data communications. This specification is known as the Institute of Electrical and Electronic Engineers (IEEE) 802.16e-2005 standard, and is incorporated herein by reference. This air interface is similar to Wireless Fidelity (WiFi) (also known as IEEE 802.11, including a, b and g versions) since a user device is connected wirelessly to an access point. However, WiMAX provides higher capacity, allows greater communications distances and provides mobility (access across different access points).

Users gain wireless connectivity in an access service network (ASN) via an access point (AP). WiMAX access points (also known as base stations) are similar to cellular access points, with each base station generally including a tower with antenna(s) situated that are locally controlled and include a base transceiver station (BTS) (sometimes also referred to as a base station controller). Once connected, users have the ability to roam from one access point (base station) to another access point.

Within the ASN, each BTS is connected (via wireless or wireline) to a controller node identified as a "gateway" (GW). Each gateway is generally responsible for controlling and communicating with a number of BTSs and is connected to a global network. Control and information relevant to a local BTS exists in the BTS. Control and information relevant to both the ASN of the end users and the BTSs exist in the gateway.

Within a WiMAX network, the ASN is broken down into functional pieces, for example, user security, accounting, mobility and quality of service (QoS). These functional entities reside or are located in the BTS, the gateway, or both. Thus, a functional entity may span both the BTS and gateway. For example, for accounting, an accounting agent exists on the BTS to monitor traffic locally. The agent reports statistics about a user's traffic behavior to the corresponding accounting controller on the gateway.

The definition of the functional entities (including peer applications of processes) and where they are located is defined by the WiMAX Network Working Group (NWG). WiMAX NWG has developed two draft documents describing various definitions and standards relating to the network system architecture for WiMAX networks, known as the (1) WiMAX End-to-End Network Systems Architecture, Stage 2 (Release 1, Aug. 8, 2006) and (2) WiMAX End-to-End Network Systems Architecture, Stage 3 (Release 1, Aug. 8, 2006), which are incorporated herein by reference. Stage 2 describes functional entities within the network while Stage 3 defines interfaces between functional entities.

Communication between each of the peer functional entities on the BTS and gateway takes place via an interface and architecture known as the "R6 reference point." However, these documents do not fully define its operation and architecture. The Stage 2 and Stage 3 documents appear to define a distributed architecture for the R6 reference point, such that each functional entity operates independently, or almost independently, of each other. In this manner, an agent application in the BTS communicates directly with its corresponding control application in the gateway over a simple User Datagram Protocol (UDP) port. As such, a "peer application" (or process) is generally defined as including two portions or entities—a peer agent entity residing and executing within the BTS and a corresponding peer control entity residing and executing within the gateway, with these two entities communicating with each other. Each agent and corresponding control application may also be referred to by itself as a "peer application." Each peer application or process utilizes both a special protocol header and yet-to-be defined standard messages. If a set of peer applications (i.e., together performing a main function in the ASN) requires either reliability or security, the set is required to build a protocol to provide this functionality between them. In addition, no mechanism is described or suggested for the BTS to discover the gateway, or vice versa, or to maintain state. For example, if a BTS is powered off or fails, the gateway has no indication of this event. Further, though keep-alive mechanisms have been suggested, this is on a per peer application basis with each peer application performing some keep-alive procedure. Having each peer application perform such a procedure results in duplication and increased overhead.

The WiMAX NWG Stage 2 or 3 documents do not provide any clear proposal relating to these issues for the R6 reference point. Initial descriptions therein indicate that there is no centralized application to assume any shared responsibilities. Rather, these responsibilities are distributed to each of the individual peer applications. With respect to reliability, due to the inclusion of different manufacturers trying to solve a given problem, a patchwork of solutions have been proposed. For example, some have defined an explicit acknowledgement for each message sent, while others have suggested a response with an implied acknowledgment, all within each specific peer application. Still others have not implemented any reliability.

Accordingly, there are needed methods and systems that provide a controller application for the establishment and maintenance of the R6 reference point (notably the R6 interface between the BTS and gateway ASN) within a WiMAX ASN, as well for providing discoverability and heartbeat communications therebetween.

SUMMARY

In accordance with one embodiment, a method is provided for controlling or monitoring an R6 reference point within an access services network (AS) between a base station and an ASN gateway. The method includes executing a R6 controller agent process within the base station; transmitting a first R6 controller-specific message to a corresponding R6 controller controlling process executing within the ASN gateway; receiving a second R6 controller-specific message from the R6 controller controlling process; and monitoring status of the R6 reference point in response to the received message In accordance with another embodiment of the present invention, there is provided a computer program embodied on a computer readable medium and operable to be executed by a processor within a communications device or system, the computer program comprising computer readable program code for performing the method described above. In yet another embodiment, an access network is provided with the means for performing the steps described above.

In accordance with yet another embodiment, there is provided an access services network (ASN) operable for providing wireless access services to an access terminal. The access services network includes a remote base station and an access services network (ASN) gateway communicatively coupled to the base station. One or more client application processes each provide a defined function within the ASN, with each client application process comprising a controlling entity operable for execution within the ASN gateway and an agent entity operable for execution within the base station, and wherein the controlling entity and agent entity are further operable for sending and receiving client application-specific messages therebetween via a R6 reference point. The network further includes an R6 controller operable for monitoring the R6 reference point between the base station and the ASN gateway. The R6 controller includes a controlling entity operable for executing within the ASN gateway and an agent entity operable for executing within the base station. Both the R6 controller controlling entity and R6 controller agent entity are operable for sending and receiving R6 controller-specific messages therebetween via the R6 reference point.

Other technical features may be readily apparent to one skilled in the art from the following figures, descriptions, and claims.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 5 illustrates a process or message flow between the BTS and the ASN gateway.

DETAILED DESCRIPTION

Figure 1:
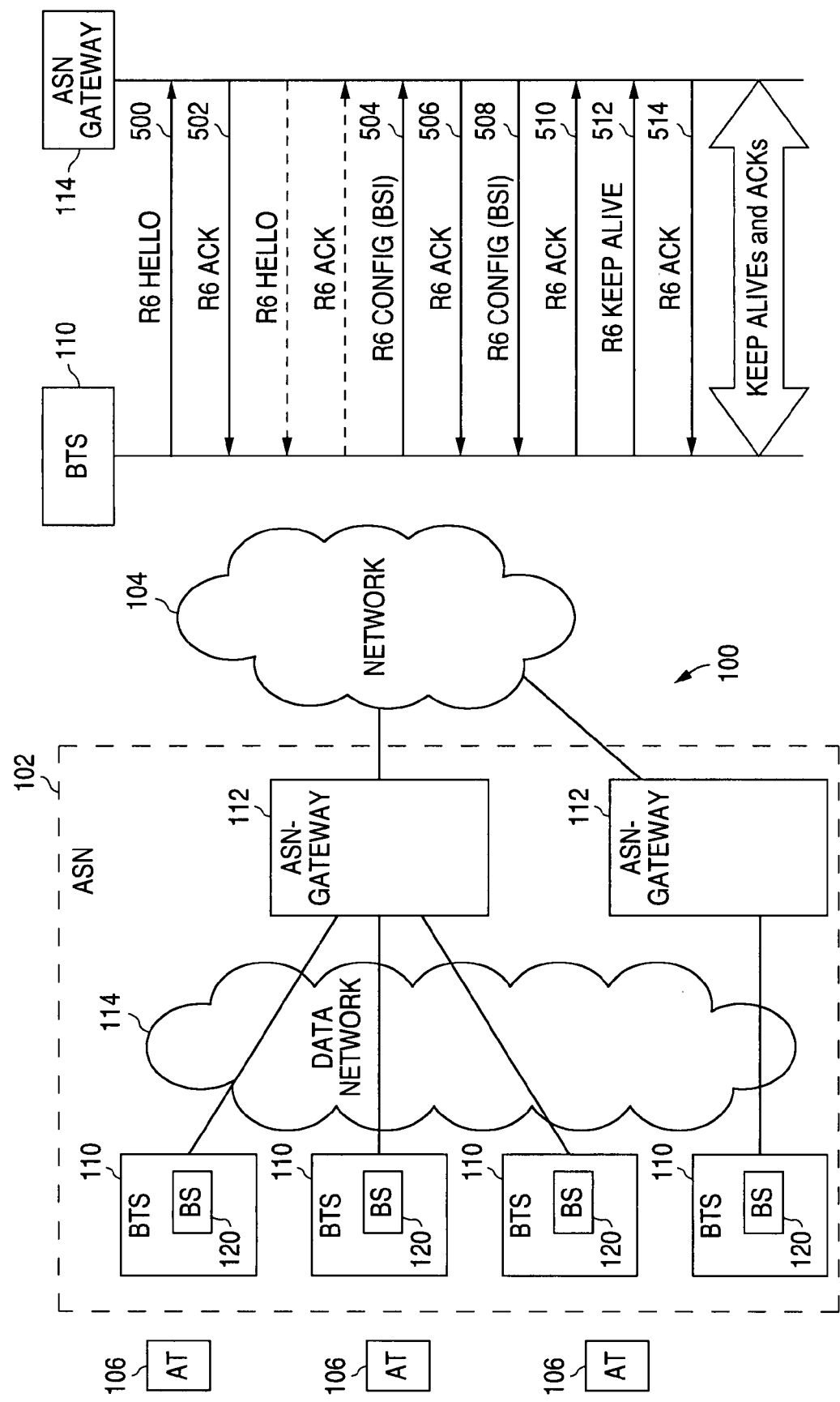
FIG. 1 depicts in block diagram form a wireless communications network in accordance with the present invention.

FIG. 1 illustrates an example communications network architecture or system 100 in accordance with the present invention. The system or network 100 shown in FIG. 1 is for illustration purposes only. Other embodiments of the system 100 may be used without departing from the scope of this disclosure. Reference to "standards" in the following text is meant to encompass existing and future versions of the referenced standards, as well as standards encompassing the principles of the invention disclosed and claimed herein.

In this example, the system 100 includes an access services network (ASN) 102, a data network 104, and one or more access terminals 106. The ASN 102 includes one or more base stations (identified as a "BTS") 110 communicating with one or more ASN gateways 112 via a data network 114. In one embodiment, the system 100 (or portions thereof) is a wireless communications network compliant or operating in accordance with the IEEE 802.16e standard (WiMAX). Though only one ASN 102 is shown, the system 100 may include additional ASNs 102.

It will be understood that the system 100 may also be configured to include various devices and networks such as connectivity server networks (CSN), not shown, or be designed with different configurations. The ASN gateway 112 provides a gateway function between the BTSs 110 and the data network 104 (and the CSNs). Each BTS 110 generally includes one or more antennas and various hardware and software components. In addition, each BTS 110 includes one or more BS "instances" (BS) 120 with each BS instance 120 representing a sector, with the BTS 110 controlling the BS instances within a BTS 110. For example, each BTS 110 may include three BTS instances (three sectors).

The network 104 and/or data network 114 may include one or more local area networks ("LAN"), metropolitan area networks ("MAN"), wide area networks ("WAN"), all or portions of a global network, or any other communication system or systems at one or more locations, or combination of these, including the public switched telephone network (PSTN), Internet, packet networks and the like. In one specific embodiment, the network 104 is an Internet Protocol (IP) based network. Typically, the network 104 is utilized for communications between the BTSs 110 and the ASN gateways 112, as well as between the ASN gateways 112 and other devices (not shown) coupled to the network 104 and within the system 100. As such, it will also be understood that the data network 114 may be separate from, or form a part of, the data network 104.

The ASN 102 has coupled thereto one or more access terminals (AT) 106 (several shown). The AT 106 is operable for communicating wirelessly with the ASN 102 over an air interface. Additional or fewer BTSs 110 and ASN gateways 112 may be included in the ASN 102 (or the system 100), with the ATs 106 communicating with one or more BTSs 110 over wireless interfaces. Different configurations of system 100 may be utilized in accordance with the present disclosure.

The ASN 102 typically includes a complete set of network functions to provide radio access to the AT 106 (such as a WiMAX compliant AT), and includes various network elements such as one or more BTSs 110 (and BSs 120) and one or more ASN gateways 112. The ASN 102 defines a logical boundary and represents the aggregation of functional entities and corresponding message flows associated with access services. The BTS 110 typically includes a BS 120 and corresponding antenna (not shown) for providing access functions for the AT 106, as well as both WiMAX MAC and PHY compliance. The ASN gateway 112 includes control plane functional entities that are paired with a corresponding functional entity in the BTS 110 (or BS 120), a resident function in a CSN (not shown), or a function in another ASN 102 or ASN gateway 112.

It will be understood that the grouping and distribution of functions or functional entities of the system 100 (most notably the ASN 102) realized by one physical device or distributed over multiple physical devices is an implementation choice, provided the functional and interoperability requirements are met.

The structure and functionality of the ASN, BTS, BS and ASN gateway are generally well-known. Each generally includes various components such as processing units, controllers and network interfaces, which necessarily include but are not limited to, microprocessors, microcontrollers, memory devices, and/or logic circuitry, and these may be adapted to implement various algorithms and/or protocols. No additional description of the conventional functionality and application of ASN, BTS, BS, and ASN gateway, other than as noted herein or relevant for an understanding of the present invention, is provided, as these are known to those of ordinary skill in the art.

A reference point is a conceptual point between two groups of functions that reside in different functional entities on each side of the reference point, also referred to as interfaces between the functional entities. These are identified using the nomenclature "RX" reference point, and defined in the standards (e.g., R1—between AT 106 and ASN 102; R3—between ASN 102 and CSN; R4—between ASN 102 and another ASN; R6—between BTS 120 and ASN gateway 112; R8—between one BS 110 and another BS 110). This disclosure will focus on the R6 reference point between the BTS 110 and the ASN gateway 112, as described more fully herein.

It will be understood that the ASN 102, the BTS 110, the ASN gateway 112 and the BS 120 may be constructed or configured from any suitable hardware, software, firmware, or combination thereof for providing the functionality known to those of ordinary skill in the art. These devices will include additional functionality as described below in accordance with one or more embodiments.

Other components, devices or networks may be included in the system 100, and FIG. 1 only illustrates but one exemplary configuration to assist in describing the system and operation of the present invention to those skilled in the art. The system represented in FIG. 1 may be described using different nomenclature or system terminology, such as use of the terms mobile subscriber terminals (MS or MT) (an access terminal), base transceiver stations or base station controllers (BTS or BSC), radio network controllers (RNC) and mobile switching centers (MSC), radio access network (ASN), and the use of any given nomenclature to describe a device within the system 100 is not intended to limit the scope of this disclosure.

The AT 106 represents a device utilized by a user or subscriber during communication sessions over/within the system 100. For example, each of the communication devices may include an input/output device having a microphone and speaker to capture and play audio information. Optionally, the communication device 106 may also include a camera and/or a display to capture/display video information. During a communication session, the AT 106 communicates with one or more other devices coupled/connected to the network 104 (or within the system 100). In this way, the AT 106 may exchange audio, video, graphical, or other information during a communication session.

The AT 106 may be constructed or configured from any suitable hardware, software, firmware, or combination thereof for transmitting or receiving information over a network. As an example, the AT 106 could represent a telephone, videophone, computer, personal digital assistant, and the like, etc.

The BTS 110 (or BS instance 120) and ASN gateway 112 define the R6 reference point therebetween and are interconnected via one or more communications lines are usually wired (but may be wireless), or any combination thereof, through the data network 114. System 100 (and data networks 104 and 114) may utilize any suitable protocol or protocols, and in a specific embodiment, the communications link (wireless or wireline) between the BTS 110 and the ASN gateway 112 functions in accordance with the Internet Protocol, and in a specific embodiment, in accordance with IPv4 or IPv6.

The R6 reference point includes a set of control (non-bearer) and data (bearer) plane protocols for communication between the BTS 110 and the ASN gateway 112. Generally speaking, the bearer plane (R6e) includes the user data path, while the control plane (R6d) includes protocols for user datapath establishment, modification, and release control in accordance with the AT 106 mobility events. The R6d plane is the "decision point" of the R6 reference point, while the R6e plane is the "enforcement" point." Typically, a data path is established between the BTS 110 and the ASN gateway 112 using one or more data path tunnels between two endpoints (using IP addresses), such as GRE, MPLS or VLAN or other tunneling or data path protocol. Each data path tunnel may be provisioned with one or more sub-channels on a per AT 106 basis, per BS instance 120 basis, and/or per data type basis (e.g., VOIP)). The control path is typically established between the BTS 110 and the ASN gateway 112 using UDP over IP, in accordance with the WiMAX Stage 2/3 specifications. This may be accomplished using IP addresses between two points and/or UDP ports for BS instances 120 on the BTS 110. In one embodiment, the BTS 110 has one IP address and utilizes UDP ports to distinguish among BS instances 120 therein. As described below, client peer application instances (among each BS instance) are distinguishable based on message type in the Stage 3 messaging format specification. In another embodiment, each BS 120 may have a different IP address and utilization of UDP ports for distinguishing among BSs 120 may not be necessary.

Figure 2:
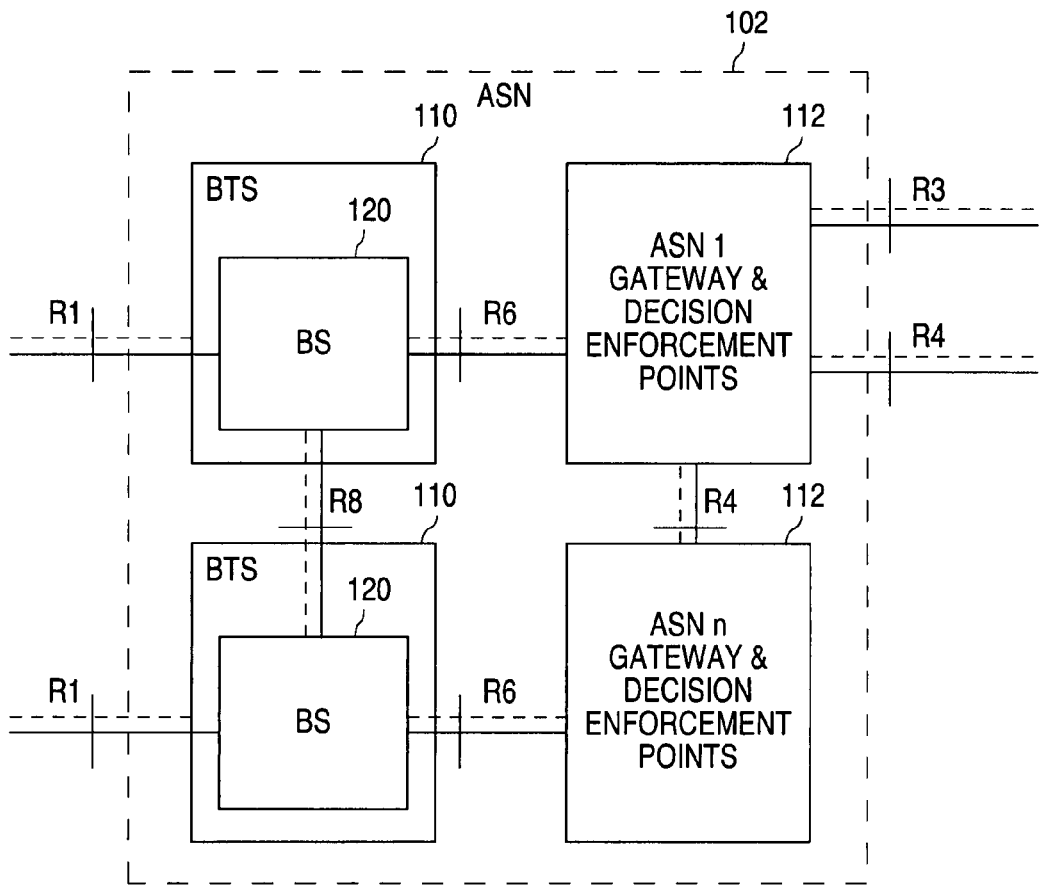
FIG. 2 is an ASN reference model illustrating the various reference points between functional devices associated with the ASN.

Now referring to FIG. 2, there is shown the ASN 102 reference model illustrating the various reference points between functional devices associated with the ASN 102. It will be understood that the BTS 110 may include more than one BS 120.

Figure 3:
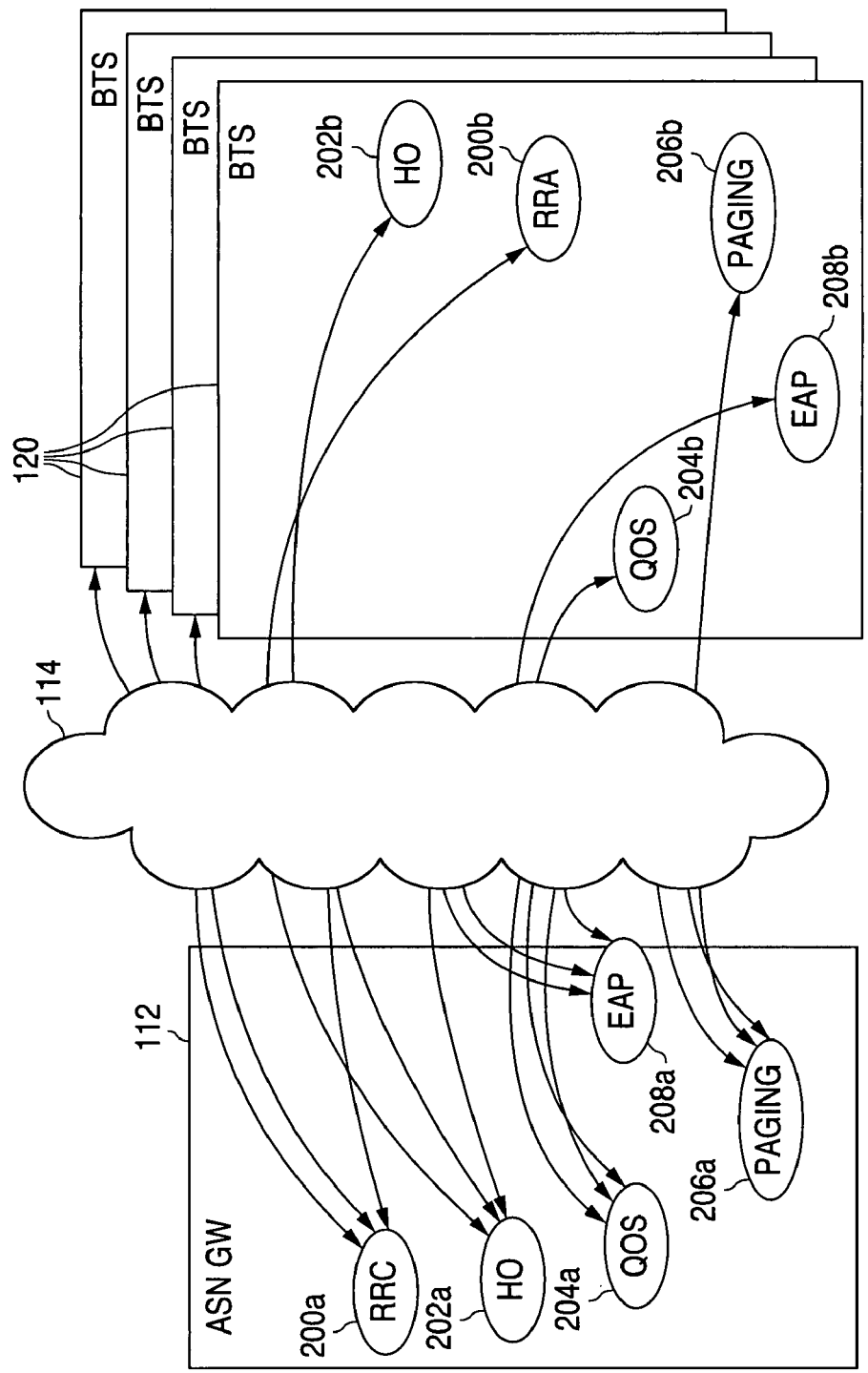
FIG. 3 illustrates current architecture including a plurality of peer applications executing in one or more BTS in accordance with the WiMAX NWG description (Stage 2, Stage 3)

Now referring to FIG. 3, there is illustrated the current architecture including a plurality of peer applications 200-208 executing in one or more BTSs 120 (within one or more BSs 110) in accordance with the WiMAX NWG description (Stage 2, Stage 3). It will be understood that each BTS 110 may operate with any number of BS instances, however, in one example there may be three instances—one for each sector (though each BS 110 may have its own BTS 120).

During normal operation, peer applications or processes are activated/executed in response to access requests (or upon startup of a BTS or BS) from an AT or during an established communication session involving an AT 106. Each peer application or process is a functional entity comprising two portions—one portion executing within the ASN gateway 112 and another portion executing within the BTS 120. Examples of peer applications or peer processes include a radio resource (RR) process 200, a handover (HO) process 202, a quality of service (QoS) process 204, a paging process 206, and an extensible authentication (EAP) process 208. Generally, one instance of the controlling entity for each process (200*a*, 202*a*, 204*a*, 206*a*, 208*a*) resides and executes within the ASN gateway 112 and controls and communications with a corresponding agent entity for each process (200*b*, 202*b*, 204*b*, 206*b*, 208*b*) within each BTS 120. Other peer applications or processes may be present, including those currently provided in the WiMAX standard, and perhaps others, including as a data path process, an R3 mobility process, an accounting process, a security process, and a context delivery process. Those shown are for illustrative purposes only.

Though not shown in the diagram, the number of peer application instances 200*b*-2008*b* for each peer application 200-208 will generally equal the number of BS instances 120 within the BTS 110 (e.g., one agent peer entity for each BS 120). For example, with three BSs instances 120 there will be three instances of each peer agent application executing or activated in the BTS 120.

Currently, each the controlling (20Xa) and agent (20Xb) entities of the functional units 200-208 communicate with each other via the R6 reference point using UDP over IP. In other words, the NWG standard describes the R6 reference point as a simple UDP connection (via data network 114) between peers. The Stage 3 messaging format is utilized (using a UDP control header) which includes a message type field identifying the process 200-208 to which the message belongs. Each process 200-208 generally operates independently of the others and is initiated and executed in response to an access request (and access connection) relating to an AT 106. Since there are multiple BTSs 110 associated with a single ASN gateway 112, and there may be multiple BSs 120 in each BTS 110, this translates to potentially hundreds of BSs 120 each having an agent entity process operating therein and associated with the controlling entity process within the ASN gateway 112.

With each process 200-208 handling its own unique and specific function, some or all may provide reliability, security, maintenance, and/or communications management capabilities for within its own realm (i.e., for itself). Thus, if any of these peers provide any such capabilities, it is limited to those capabilities specifically related to that particular process, thereby necessitating each process to perform the functions, which results in processing duplication and additional overhead.

The present disclosure provides for a new architecture for the BTS 110—ASN gateway 112 pair relating to the R6 reference point. A new functional entity is provided and identified as the "R6 controller" peer application or process. The R6 controller process will include two portions, similar to the other processes 200-208, with a controlling entity residing and executing at the ASN gateway 112 and an agent entity residing and executing at each BTS 120. The R6 controller process provides the following functionality: R6 peer discovery via a discovery mechanism, capabilities or configuration exchange between BS peers, and R6 peer relationship maintenance via a global or centralized keep-alive mechanism or procedure.

The R6 controller process may also provide gateway and formatting functions for the known processes 200-208, referred to as "client peer applications." Formatting and transmission of standards compliant messages will be the responsibility of the R6 controller process rather than each of the peer applications processes 200-208. In addition, the R6 controller beneficially institutes a keep-alive mechanism or procedure globally (on a BTS per ASN gateway basis) to replace the individual keep-alive mechanisms that may be running in each client peer application. Thus, reliability and security can be supplied by the R6 controller process.

As described below, introduction and implementation of the R6 controller process within the architectural framework will allow for the centralization of responsibilities which are shared, at present, by many client functional entities. The R6 controller process takes responsibilities which are common to many functional entities and rather than distribute this responsibility, centralizes them into one functional entity known as the R6 controller. As described, examples of shared responsibilities are reliability, security, peer capabilities and configuration exchange, peer discovery and peer state maintenance.

Consolidation of the R6 interface to a single functional entity provides several advantages. It is simpler, easier to implement, limits costs due to typical standards modifications churn and centralizes standards compliance. Distributing this functionality to the designers/manufacturers of the present functional entities would increase time, cost and complexity of these entities. The present disclosure allows for less expensive and easier integration with other standard-compliant products.

Figure 4:
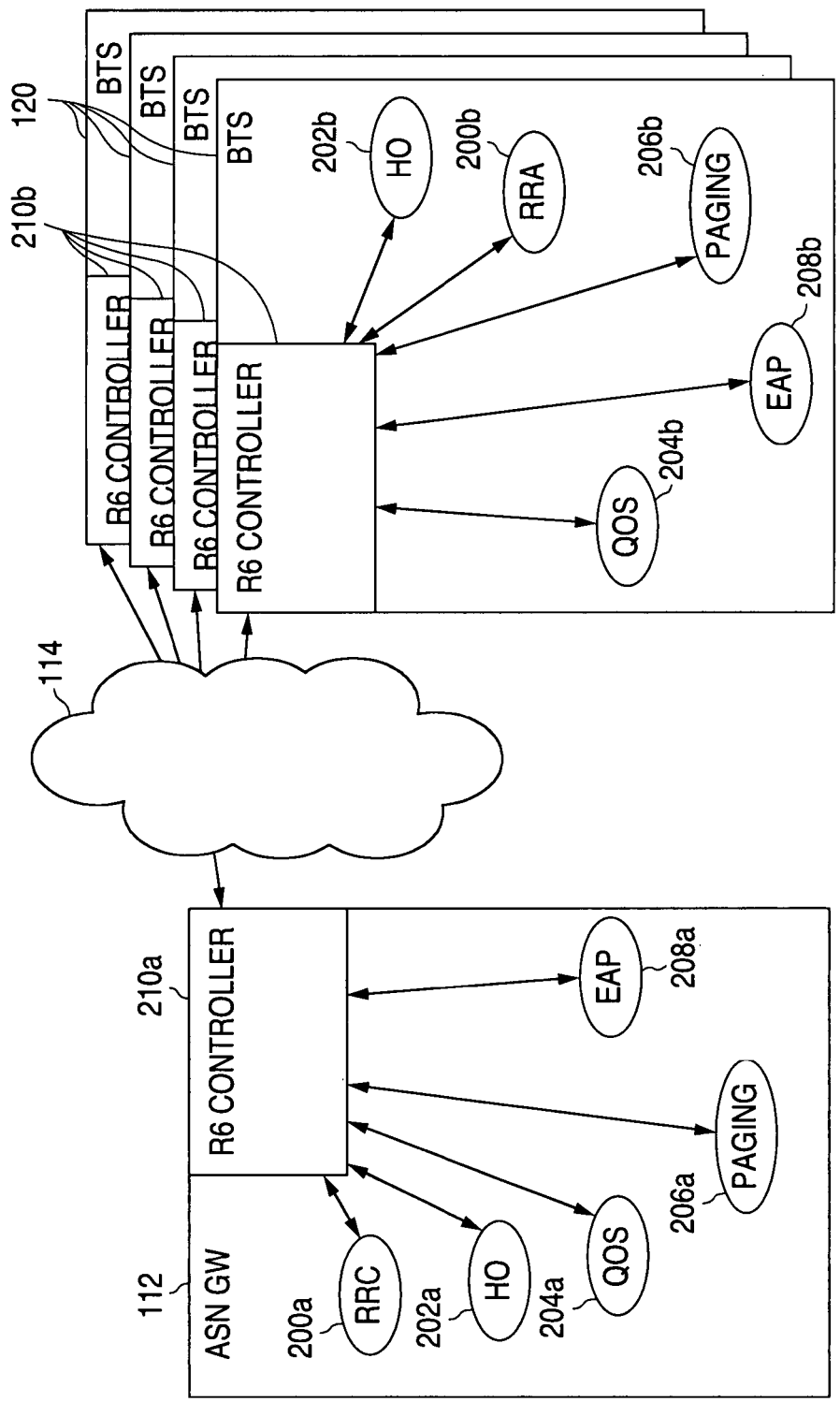
FIG. 4 illustrates a BTS-ASN gateway architecture in accordance with the present disclosure.

Now referring to FIG. 4, there is illustrated a new BTS-ASN gateway architecture including the plurality of peer application processes 200-208 executing in the one or more BSs 110 (within one or more BTSs 110) and the ASN gateway 112. A new peer application process 210, identified as the R6 controller process 210, is introduced. Generally, a single instance (or possibly multiple instances) of a controlling entity 210*a* resides and executes within the ASN gateway 112 and controls and communicates with one or more corresponding agent entities 210*b* within each BTS 120. Generally, multiple instances (e.g. one per BS 120) of an agent entity 210*b* resides and executes within the BTS 110 and controls and communicates with the corresponding agent entity 210*a* within the ASN gateway 112. The R6 controller 210 is therefore, another major protocol functional entity within the ASN 102.

In one embodiment, the R6 controller 210 (and each of its entities) is embodied as a software process that executes within the respective gateway 112 and BTS 110 as a software process component of the overall hardware/software system configuration for these devices. However, the R6 controller 210 and its entities may also be constructed of one or more discrete hardware/software components that interoperate with the other components of the gateway 112 and/or BTS 110.

The present disclosure further provides for a set of messages (or messaging protocol) between the R6 controller agent entity 210*a* and the corresponding R6 controller entity 210*b* within the ANS gateway 112. These messages are compliant with the R6 messaging protocol, such as the WiMAX Stage 3 messaging format. The messages are transmitted via the R6 interface. Various location independent messages (i.e., originating from either R6 controller entity) may be generated and transmitted by the R6 controller 210. These may include R6 controller hello, acknowledgement, configuration, and keep-alive messages. Other messages/types may be utilized as desired. In one embodiment, the messaging structure and format for the R6 controller 200 complies with the WiMAX standards (NWG) (see, Stage 3 Messaging Format), with a unique function type identifying the R6 controller and various message types, such as described above.

Now referring to FIG. 5, there is shown one embodiment of a process or message flow between the BTS 110 and the ASN gateway 112. Upon power-up, restart or initial connection or operational start of a BTS 110 or ASN gateway 112 in the ASN 102, one or both of the R6 controller agents 210*a*, 210*b* initiates a process to discover its corresponding R6 controller agent. This is accomplished through utilization of R6 hello and acknowledgment messages.

A HELLO message is generated and transmitted from the R6 controller entity 210*b* after the client agent entities 200*b*-208*b* associated with the BTS 110 are operational. Generally, this occurs when at least one BS instance 120 (and its associated peer agents) are up and running. The R6 controller entity 210*b* may determine this operational status using one of various methods, including polling the agents directly, checking a central status register or registers (updated by the agents) or receiving specific messages from the agents. Similarly, the R6 controller controlling entity 210*a* may generate HELLO messages (not shown in FIG. 5).

In one embodiment, the R6 controller agent 210*b* corresponds to the BTS 110. FIG. 5 and the description herein describe a configuration in which a single R6 controller agent 210*b* is associated with the BTS 110. However, in another embodiment, multiple R6 controller agents 210*b* might be provisioned within the BTS 110 with each corresponding to a BS instance 120 (which may also include an additional BTS-specific R6 controller agent), and all or some of the teachings and processes described herein may implemented in each such instance of the R6 controller agent 210*b*.

As shown in FIG. 5, the BTS 110 transmits an R6 HELLO message to the ASN gateway 112 (step 500). The ASN gateway 112 responds with an ACK (acknowledgement) message (step 502). ACK messages may be automatic or may be generated when all client controller entities are determined to be executing or active within the ASN gateway 112. This process effectively enables the R6 controller entities 210*a*, 210*b* to discover each other, and as a result, the BTS 110 and ASN gateway 112 initially discover each other.

In addition to the HELLO and ACK message handshake originated by the BTS 110, or alternatively, a similar R6 HELLO and ACK message handshake (shown in dotted lines) may be originate from the ASN gateway 112.

A CONFIG message carrying configuration or capabilities information may also be utilized and managed by the R6 controller 210. A CONFIG message originated by the BTS 110 includes base station information (e.g., BS id, neighboring BS ids, paging info., etc.) and is transmitted to the ASN gateway 112 (step 504). An ACK message may be transmitted in response (step 506). Similarly, and either independently or in response to the BS CONFIG message (504), the ASN gateway 112 transmits an ASN gateway configuration message which includes gateway and other system information (e.g., keep-alive interval, dead interval, UDP ports for session managers, paging controllers etc.) to the BS 120 (step 508). An ACK message may be transmitted in response (step 510). It will be understood that the CONFIG messages from the BTS 110 are generally per-BTS, but when each BS instance 120 becomes operational, a new CONFIG message may be sent with its corresponding information.

To monitor operational status of the R6 reference point or interface, the R6 controller performs and manages a keep-alive procedure or process. KEEP ALIVE messages and corresponding ACK messages are also utilized thereby enabling the R6 controller entities 210*a*, 210*b* to detect a problem with the R6 connection point or interface. Thus, the R6 controller 210 utilizes and manages a single or centralized keep-alive process on behalf of all the client applications 200-208. As a result, none of the client applications need to perform their own keep-alive process, thus eliminating duplicity and decreasing overhead control traffic over the R6 interface. As with HELLO messages, the KEEP ALIVE process and its messages are usually executed by the single R6 controller agent 210*b*, but if multiple R6 controller agents exist (one per BS instance, and perhaps one associated with the overall BTS 110), the process may be implemented by each such R6 controller agent 210*b*.

In most embodiments, the client applications 200-208 (and each of their entities) do not individually transmit any KEEP ALIVE messages or execute any keep alive process or procedure. This is done centrally by the R6 controller 210.

As shown in FIG. 5, a KEEP ALIVE message is generated and transmitted to the ASN gateway 112 (step 512). An ACK message may be transmitted in response (step 514). Thereafter, periodic KEEP ALIVE messages are transmitted, and corresponding ACK messages are received, by the BTS 110. The KEEP ALIVE messages (512) are usually transmitted in accordance with the keep-alive interval. The keep-alive interval is set by the ANS gateway 112 (and usually carried in a CONFIG message) but may be determined by the BTS 110. Optionally, when an ACK message is not received, a secondary dead interval period may be used during which the BTS 110 tries again to send one or more additional KEEP ALIVE messages.

When an expected ACK message is not received in response to transmission of a KEEP ALIVE message, the R6 controller agent 210*b* concludes there is a problem with the R6 interface, and takes appropriate action. Such action may include, but is not limited, to informing one or more of the local client applications 200*b*-200*b* of the problem (passive or active communication, such as by setting status bits in a register, sending individual messages, etc.), having the session manager inform all ATs 106 of this issue, initiate handoff procedures for the ATs 106, or any other function(s) as desired.

It will be understood that the ASN gateway 112 may also originate and send KEEP ALIVE messages for redundancy purposes.

The HELLO, CONFIG, KEEP ALIVE and ACK messages will generally include transaction identification (TID) and sequence numbers (S), and may also carry additional information. As will be appreciated, all or some of the foregoing messages may be combined into one message that includes the information in the multiple messages.

As noted, the same or similar process may be implemented for each BS instance 120, instead of, or in addition to, implementation by the R6 controller agent 210*b* associated to the BTS 110.

In another embodiment, the R6 controller entities 210*a*, 210*b* function as gateways (e.g., collection, dissemination, modification, and/or formatting) for the R6 messaging information transferred between active agent and controlling client application process pairs 200*a*-200*b*, 202*a*-202*b*, 204*a*-204*b*, 206*a*-206*b*, 208*a*-208*b*.

Figure 6:
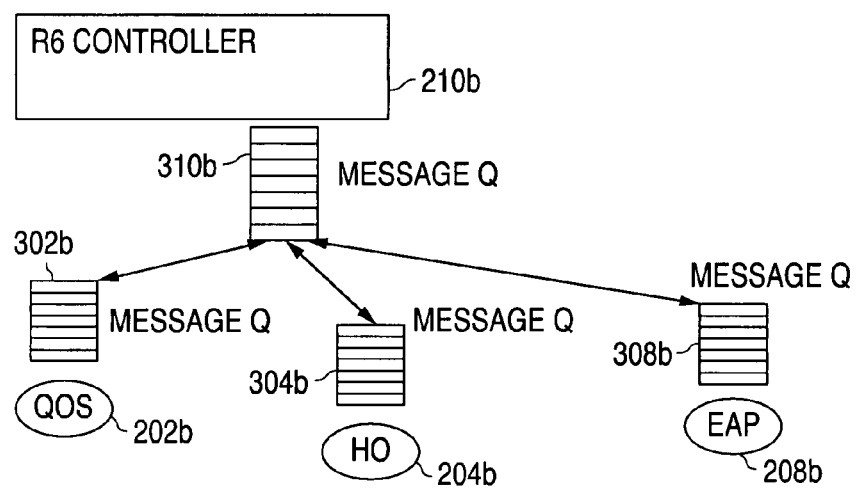
FIG. 6 illustrates message/data flow between an R6 controller peer and three client application peer instances for a BS instance executing within a BTS.

Now referring to FIG. 6, there is illustrated message/data flow between the R6 controller peer 210*b* and three of the client application peer instances 202*b* (HO), 204*b* (QoS), and 208*b* (EAP) executing within a BTS 120. Each peer instance includes a corresponding message queue 302*b*, 304*b*, 308*b*, 310*b*. For illustrative purposes, only three client application peer processes are shown. In general, client applications 200*b*-208*b* generate and send peer-intended messages (message information) to the R6 controller 210*b*. The R6 controller 210*b* converts the messages into a standards format message (e.g., an R6 message compliant with WiMAX standards) and transmits these to its corresponding R6 controller 210*a* via the data network 114. Though not shown in FIG. 5, client applications 200*a*-208*a* similarly generate and send peer-intended messages (message information) to the R6 controller 210*a* in the ASN gateway 112. The R6 controller 210*a* converts the messages into a standards format message (e.g., an R6 message compliant with WiMAX standards) and transmits these to its corresponding R6 controller 210*b* via the data network 114.

Upon receipt, the receiving R6 controller 210*a*, 210*b* translates or converts the received R6 message into another format and relays the message (or the relevant messaging information) to the destination peer client application 200-208.

In one embodiment, each of the R6 controller entities 210*a*, 210*b* and the client application entities 200*a*-208*b* includes a message queue (with transmission and reception queues). If desired, the transmission of messages in the transmission portion of the queue 310*a*, 310*b* of the R6 controllers may be prioritized. For example, messages to/from the HO client application 202a, 202b (or the R3 mobility client application, not shown) may have priority over messages from other client applications due to increased importance.

In addition, the R6 controller gateway messaging scheme enables detection of problems with a client peer application or the R6 controller peer (and even problems with a BTS 110 or ASN gateway 112) and provides notification to interested client applications 200-208. Thus, when a problem is detected by the R6 controller 200, a problem notification message is generated and sent to each of the client applications 200-208 for notification purposes. Depending on the type of problem, the client applications agents 200-208 will take further action consistent with the type of problem notified to them.

The R6 controller 210 may provide other functions, such as reliable message transport and secure message transport. This may applied to the message exchange for the R6 controller messages, as well as the R6 messages exchanges between client application pairs 200-208 controlled and monitored by the R6 controller 210.

In one embodiment, the processes and system described herein operate in accordance with the WiMAX standard(s) (802.16e-2005, NWG Stage 2, 3). However, the concepts and teachings herein may be utilized with other protocols or specifications.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An access services network (ASN) configured for providing wireless access services to an access terminal, the access services network comprising:
    a remote base station;
    an access services network (ASN) gateway communicatively coupled to the base station;
    one or more client application processes each providing a defined function within the ASN, each client application process comprising a controlling entity configured for execution within the ASN gateway and an agent entity configured for execution within the base station, and wherein the controlling entity and agent entity are further configured for sending and receiving client application-specific messages therebetween via a R6 reference point;
    an R6 controller configured for monitoring the R6 reference point between the base station and the ASN gateway, the R6 controller comprising a controlling entity configured for executing within the ASN gateway and an agent entity configured for executing within the base station, the R6 controller controlling entity and R6 controller agent entity being further configured for sending and receiving R6 controller-specific messages therebetween via the R6 reference point.

2. The network in accordance with claim 1 wherein the one or more client application processes comprises a one of: quality of service (QoS), handover (HO), data path, context delivery, R3 mobility, radio resource manager (RR), paging and security.

3. The network in accordance with claim 1 wherein the R6 controller-specific messages transmitted over the R6 reference point are in accordance with a WiMAX NWG Stage 3 formatting standard.

4. The network in accordance with claim 1 wherein the R6 controller-specific messages transmitted over the R6 reference point comprise a keep-alive message transmitted at a predetermined time.

5. The network in accordance with claim 4 wherein the keep-alive message is transmitted in response to expiration of a keep-alive timer.

6. The network in accordance with claim 4 wherein the keep alive message is generated and transmitted by the R6 controller agent entity executing within the base station, and wherein the R6 controller agent entity performs one or more actions in response to a failure to receive a corresponding acknowledgment message from the R6 controller agent entity executing within the ASN gateway.

7. The network in accordance with claim 1 wherein the R6 controller further provides management and control functions for the R6 reference point.

8. The network in accordance with claim 1 wherein each of the one or more client application agent entities sends the client application-specific messages in a first format to the R6 controller agent entity within the base station, and the R6 controller agent entity sends these messages in a second format to its corresponding R6 controller controlling entity within the ASN gateway.

9. The network in accordance with claim 8 wherein the second format is WiMAX NWG Stage 3 standard compliant.

10. A method for controlling an R6 reference point within an access services network (AS) between a base station and an ASN gateway, the method comprising:
    executing a R6 controller agent process within the base station;
    transmitting a first R6 controller-specific message to a corresponding R6 controller controlling process executing within the ASN gateway;
    receiving a second R6 controller-specific message from the R6 controller controlling process;
    monitoring status of the R6 reference point in response to the received message;
    executing a plurality of client application agent processes within the base station;
    generating in a first format a first plurality of client application-specific messages intended to be received by a plurality of corresponding client application controlling processes executing within the ASN gateway;

sending the plurality of client application-specific messages to the R6 controller agent process;
generating, by the R6 controller agent process, a second plurality of client application-specific messages in a second format from the first plurality of client application-specific messages; and
transmitting the second plurality of client application-specific messages to the ASN gateway.

11. The method in accordance with claim 10 further comprising:
executing the R6 controller controlling process within the ASN gateway.

12. The method in accordance with claim 10 wherein the first message in formatted in accordance with a WiMAX NWG Stage 3 standard.

13. The method in accordance with claim 10 wherein the first message comprises a keep-alive message and the second message comprises an acknowledgment message; and wherein the acknowledgement message corresponds to the first message.

14. The method in accordance with claim 13 further comprising:
transmitting the keep-alive message after a predetermined time period has elapsed.

15. The method in accordance with claim 14 further comprising:
resetting a keep-alive timer with a keep-alive interval in response to receiving the second message.

16. The method in accordance with claim 15 further comprising:
initiating one or more actions within the base station in response to failing to receive the acknowledgment message.

17. The method in accordance with claim 10 wherein the second format is WiMAX NWG Stage 3 standard compliant format.

18. A computer program embodied on a non-transitory computer readable medium and operable to be executed by a processor within a base station, the computer program comprising computer readable program code for:
executing a R6 controller agent process within the base station;
transmitting a first R6 controller-specific message to a corresponding R6 controller controlling process executing within the ASN gateway;
receiving a second R6 controller-specific message from the R6 controller controlling process;
monitoring status of an R6 reference point between the base station and the ASN gateway;
executing a plurality of client application agent processes within the base station;
generating in a first format a first plurality of client application-specific messages intended to be received by a plurality of corresponding client application controlling processes executing within the ASN gateway;
sending the plurality of client application-specific messages to the R6 controller agent process;
generating, by the R6 controller agent process, a second plurality of client application-specific messages in a second format from the first plurality of client application-specific messages; and
transmitting the second plurality of client application-specific messages to the ASN gateway.

19. The computer program in accordance with claim 18 wherein the first message is a keep-alive message and the second message is a corresponding acknowledgment message, and the computer code is further operable for:
transmitting the keep-alive message after a predetermined time period has elapsed;
resetting a keep-alive timer with a keep-alive interval in response to receiving the corresponding acknowledgment message; and
initiating one or more actions within the base station in response to failing to receive the acknowledgment message.

20. The computer program in accordance with claim 18 wherein the first message comprises a keep-alive message and the second message comprises an acknowledgment message; and wherein the acknowledgement message corresponds to the first message.

* * * * *